Figure 1:
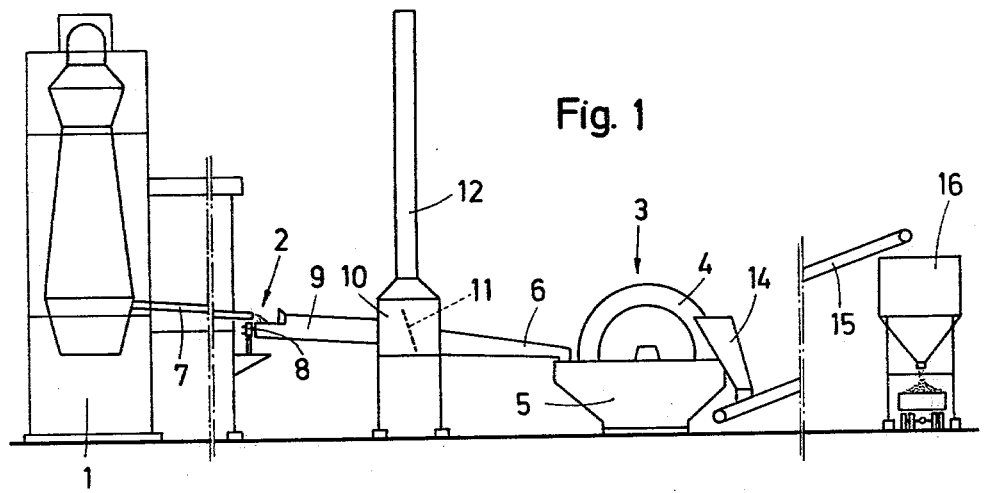

United States Patent [19]

Müller-Späth et al.

[11] 4,196,078
[45] Apr. 1, 1980

[54] PROCESS AND APPARATUS FOR DEWATERING GRANULATED MATERIAL, ESPECIALLY GRANULATED BLAST FURNACE SLAG

[76] Inventors: Erich Müller-Späth; Konrad Müller, both of Schelder Strasse, 5905 Freudenberg-Oberfischbach; Heinz Kister, Erbenstrasse 8, 4600 Dortmund 12; Walter Schürhoff, Forstbaum 3; Friedrich W. Hillnhütter, Kleiner Floraweg 40, both of 4600 Dortmund 50; Walter Laucht, Kampenstrasse 10, 5800 Hagen, all of Fed. Rep. of Germany

[21] Appl. No.: 961,388

[22] Filed: Nov. 14, 1978

[30] Foreign Application Priority Data

Feb. 22, 1978 [DE] Fed. Rep. of Germany ....... 2807441

[51] Int. Cl.² ..................... B01D 23/24; B01D 37/02
[52] U.S. Cl. .................................. 210/75; 210/77; 210/80
[58] Field of Search ................. 210/77, 161, 160, 400, 210/401, 402, 404, 75, 79, 80

[56] References Cited

U.S. PATENT DOCUMENTS

4,024,066  5/1977  Von Boehn et al. ............... 210/404

*Primary Examiner*—Frank Sever
*Attorney, Agent, or Firm*—Young & Thompson

[57] ABSTRACT

Method and apparatus for dewatering granulated material, particularly blast furnace slag that has been granulated by quenching hot slag. The quenched material is dewatered in a bucket wheel whose scoops have perforated bottoms. The solids from the wheel are discharged onto a continuous conveyor; while the liquid is passed along an inclined filter and then clarified and reused. Various filter and clarifier constructions are disclosed.

1 Claim, 7 Drawing Figures

PROCESS AND APPARATUS FOR DEWATERING GRANULATED MATERIAL, ESPECIALLY GRANULATED BLAST FURNACE SLAG

When dewatering natural sand or natural gravel, the water-sand-gravel mixture is conveyed by a suction dredge from a dredge pond via pipelines to a bucket wheel device. The bucket wheel takes the sand and/or gravel with the water from a trough in perforated scoops and delivers this material after approximately one-half of a revolution via a hopper to a continuous conveying means (for example a conveyor belt) from which the material then passes, for example, into a loading silo. The water overflowing at the bucket wheel trough is returned into the dredge pond. This recycled water still contains sand which, when obtaining natural sand or natural gravel is unimportant inasmuch as the fill made up of sand or gravel components from the recycled water, formed in the dredge pond, can subsequently be removed again during the continuing dredging.

In the dewatering of granulated materials formed by the effect of water, such as, for example, in the dewatering of blast furnace slag sand, formed by spraying water into the hot-fluid slag stream, the water must be circulated in a closed cycle in order to recover the water for reuse. For this purpose, plants are known with dewatering silos wherein the slag sand-water mixture is fed to several dewatering silos in turn by pipelines located at the top; this arrangement necessitates appropriate pumping systems. Consequently, the expenses are correspondingly high. The use of a bucket wheel dewatering system in the field of blast furnace slag production causes difficulties, since the thus-removed water contains too many granule components; although these components could be collected in a correspondingly large and deep settling tank, this would require too frequent a cleaning of the settling tank.

The invention is based on the object of providing a novel process for the dewatering of granular bulk material, as well as a corresponding apparatus for carrying out this process, which can be used in an economical and space-saving fashion especially in the slag sand dewatering procedure in the blast furnace area.

The novel process for the dewatering of granular bulk material, especially blast furnace slag, which is granulated to sand by the injection of water into the liquid slag stream, resides, in accordance with the invention, in that the slag sand-water mixture is fed to a bucket wheel device, the slag sand is dewatered in perforated scoops of the bucket wheel and fed to a continuous conveyor via a hopper, and that the water overflowing from a trough of the bucket wheel device, which water is contaminated by solids, is clarified.

In accordance with a first embodiment of the process of this invention, the water overflowing from a trough of the bucket wheel device and containing floating and suspended particles is collected in filter chutes wherein the floating and suspended particles form a filter layer over a screen bottom, wherein this filter layer is maintained at a desired level by means of a vertically adjustable scraper means due to the fact that the scraper means continuously removes the granules of the filter layer at the top and conveys same to the continuous conveyor, and wherein the water, filtered in this way, is fed to a settling tank for purposes of reuse.

In a second embodiment of the dewatering process according to the invention, the water, contaminated by solids, is treated by means of a clarification method wherein the solids are enriched in a small amount of the water, the main quantity of the water is separated essentially free of solids and passed on to reuse, and the small amount of water having a high solids concentration is discharged.

An advantageous further development of this process resides in that the small amount of water having a high solids concentration is fed to the bucket wheel, the solids then being separated in the perforated scoops of the bucket wheel by means of the slag sand which acts as a filter.

An apparatus according to this invention for dewatering granular bulk material, comprising a bucket wheel rotating in a trough, an overflow chute system, and a continuous conveyor taking over the bulk material from the bucket wheel, especially for conducting the first-mentioned process for the dewatering of foundry sand, is characterized in that there are provided, alongside of the trough, a filter chute with a perforated bottom for collecting the floating and suspended particles of the granulated material or sand, as well as, within or above the filter chute, a vertically adjustable scraper device for scraping off a filter layer consisting of the granulated material or sand.

In this connection, a filter chute and a scraper device are advantageously provided on each side of the bucket wheel trough.

Suitably, at least the perforated bottom of the filter chute is arranged to be ascending obliquely in the conveying direction of the scraper device.

The scraping device can comprise a continuously rotating belt of rubber or the like with scraper blades extending therefrom at regular intervals; however, the scraping device can also consist of a screw or helical conveyor rotating in a round chute formed by the perforated bottom.

Furthermore, the scraper device can be fashioned to be vertically adjustable independently at both ends, providing the possibility that the filter layer consisting of granulated material can optionally be maintained at different thicknesses across the total length of the filter chute.

Finally, an additional overflow chute can be provided along the outer longitudinal side of each filter chute, the drain of this overflow chute terminating in the drain pipe of a water collecting and discharging chamber arranged underneath the perforated bottom.

A second apparatus for the dewatering of granular bulk material of the type described in the foregoing includes a clarifier with a thickening unit, the latter being connected to the overflow system of the bucket wheel via a connecting conduit and containing, in the upper portion, a clarifier with a discharge conduit for the extensively solids-free water and, in the lower portion, a thickening device for the solids with a drain.

In this connection, the thickening unit can exhibit an external tank with a continuously extending overflow chute and with a thickening hopper arranged at the lower end, as well as an internal tank into which is introduced the water withdrawn via a connecting conduit from the overflow chute system of the bucket wheel and being contaminated by solids, wherein the internal tank acts as the stilling tank.

According to a further feature of the invention, the connecting conduit for the internal tank of the thickening unit is arranged tangentially.

A further advantageous embodiment of this invention resides in that radially extending overflow chutes are arranged between the internal tank and the continuously extending overflow chute of the thickening unit, these overflow chutes being connected to the continuously extending overflow chute.

The invention furthermore provides that the drain of the thickeneing hopper of the thickening unit is connected to a feed pump which pumps the concentrated water-solids mixture from the thickening unit into a delivery means arranged above the perforated scoops of the bucket wheel emerging from the water and filled with slag sand-water mixture.

According to another feature of the invention, a bypass conduit with a shutoff valve is incorporated into the dewatering apparatus, this bypass conduit branching off from the connecting conduit between the thickener and the bucket wheel delivery means and entering the thickener.

In a modified embodiment of the apparatus of this invention, the delivery means above the bucket wheel for feeding the concentrated water-solids mixture from the thickener is omitted, and the drain of the thickener is connected via a discharge conduit to a settling tank or the like.

The process of this invention and the apparatus operating in accordance with this process, in both embodiments, make it possible to thoroughly dewater granular bulk material while simultaneously obtaining a water of a high quality for reuse. The dewatering device is distinguished by reduced structural expenditure and resultant lower initial investment costs, a higher operating safety, as well as a smaller space requirement.

Figure 2:
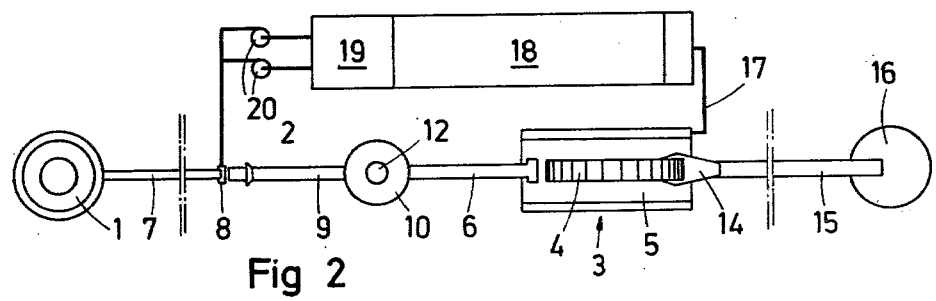
Figure 5:
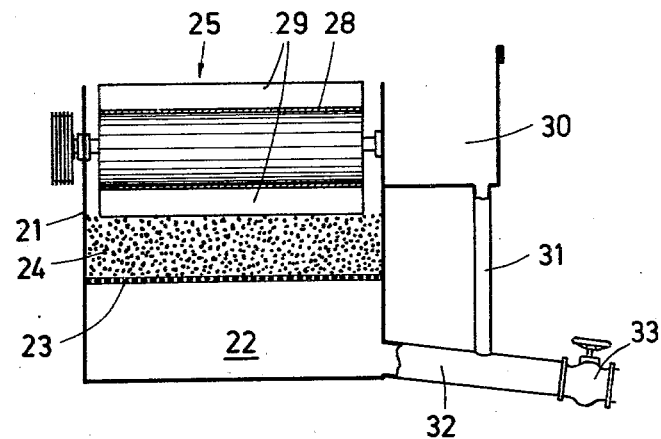
Figure 3:
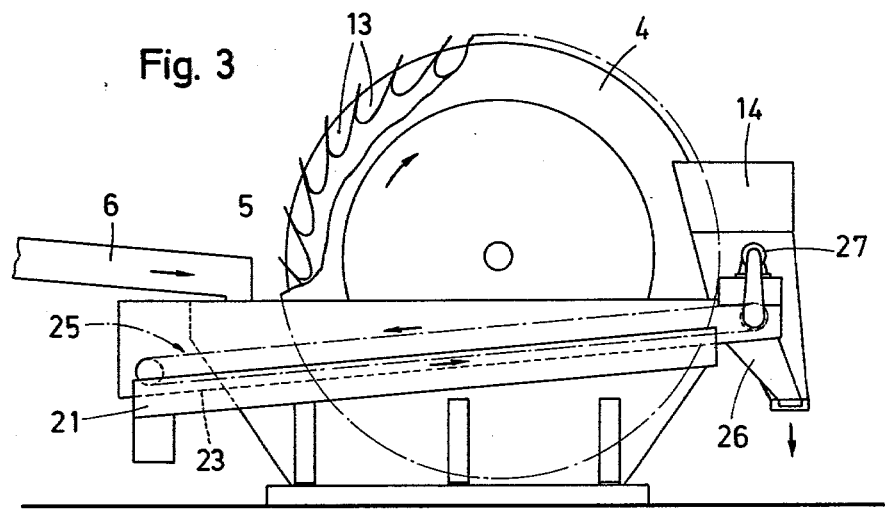
Figure 4:
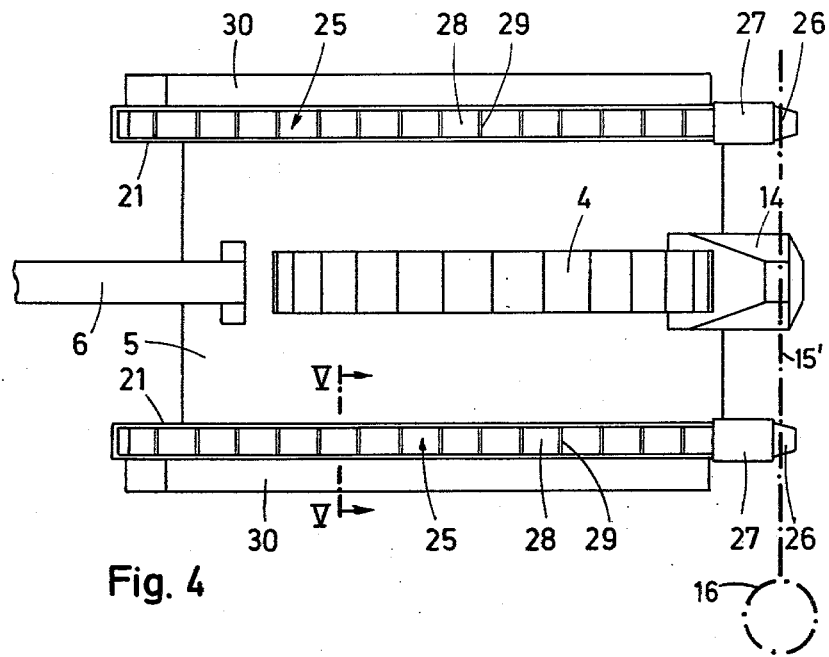
Figure 6:
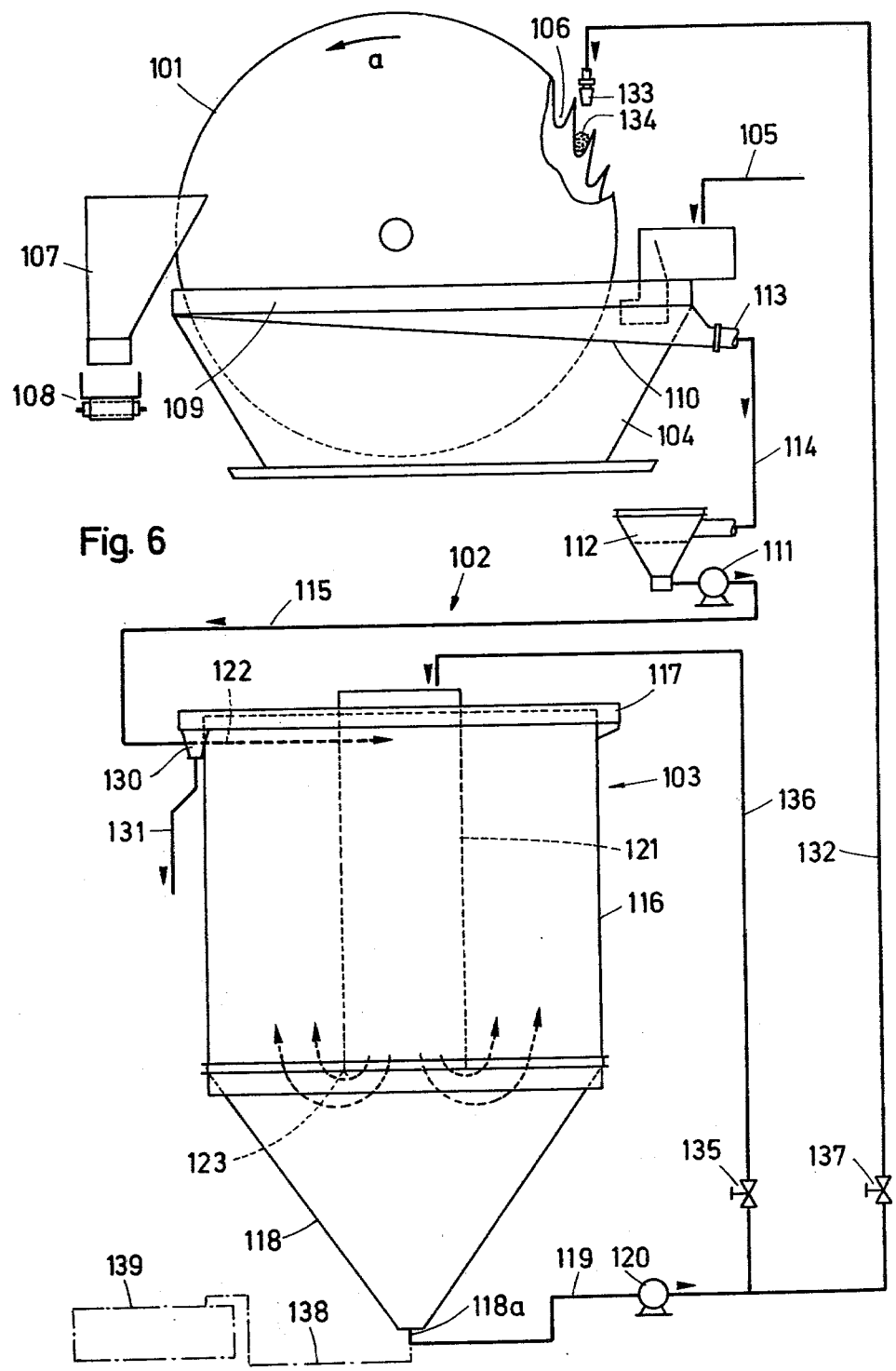
Figure 7:
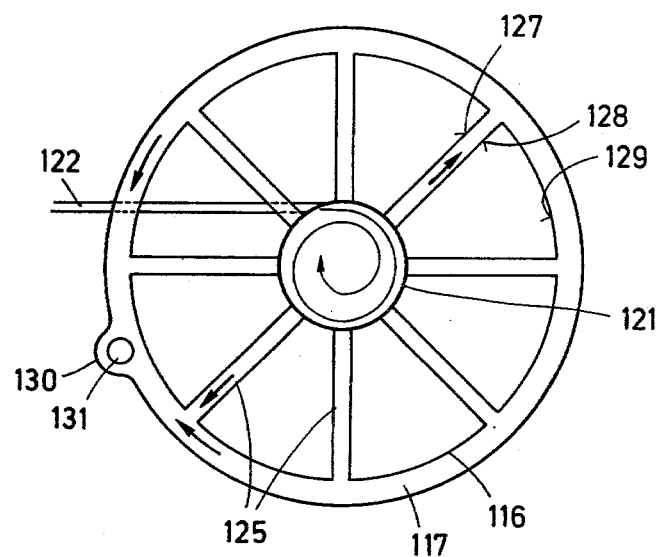

The utilization of the invention in the dewatering of foundry sand will be described with reference to two embodiments of apparatus of this invention, schematically illustrated in the drawings wherein:

FIG. 1 is a schematic lateral view of a first system for the granulation and dewatering of blast furnace slag, FIG. 2 is a top view of this system, FIG. 3 shows a lateral view of the bucket wheel device, FIG. 4 shows a top view of the bucket wheel device, FIG. 5 shows a section through a filter chute along line V—V in FIG. 4, FIG. 6 is a schematic representation of a second apparatus according to this invention for dewatering blast furnace slag, and FIG. 7 is a top view of the thickener of the dewatering device according to FIG. 6.

In the blast furnace plant 1 illustrated in FIGS. 1 and 2 comprising a slag granulating device 2 and a slag sand dewatering device 3, a bucket wheel 4 is provided which revolves in a trough 5, into which enters the sand-water mixture by way of an inlet pipe 6. The granulating device 2, to which the hot-fluid slag is fed from the blast furnace 1 via a slag chute 7, comprises a spraying head 8, by way of which a water jet (or several jets) is injected under pressure into the stream of the liquid slag, whereby the slag is granulated to slag sand. The steaming mixture of sand and water passes via a feed chute 9 into a collecting tank 10 with a baffle 11 and with a steam exhaust flue 12, before it is introduced via the inlet pipe 6 into the trough 5 of the bucket wheel 4. The bucket wheel 4 withdraws the sand-water mixture from the trough 5 by means of perforated scoops 13 (FIG. 3); the water can run out of the perforated scoops 13 back into the trough 5, and the sand passes, after approximately half a revolution of the bucket wheel 4, into a hopper 14 and from there into a continuous conveyor in the form of a conveyor belt 15. By means of the conveyor belt 15, a loading silo 16 is filled up; this silo can contain a dewatering unit of a conventional type of construction.

From the dewatering device 3, the water flows by way of a conduit 17 (FIG. 2) into a settling tank 18 and from there into a pump sump 19. From the latter, the water is recycled by means of pumps 20 to the spray head 8.

In FIGS. 3–5, the dewatering device is shown in detail. Respectively one filter chute 21 is arranged along the two longitudinal sides of the trough 5; the water, together with floating and suspended granular particles, for example slag sand, flows over into these chutes. In each filter chute 21, a perforated bottom 23 (FIG. 5) is arranged above a water collecting and discharging chamber 22 disposed above the chute bottom; the floating and suspended particles accumulate on this perforated bottom in the form of a filter layer 24. The thickness of the filter layer 24 is determined by a scraper means 25 which abrades the excess granular particles and the finely particulate grains collecting on the surface, which would impair the degree of filtering efficiency, and conveys same into a hopper 26, through which these particles and grains fall onto the conveyor belt 15, the latter conveying the granulated material into the loading silo 16. The line of symmetry 15' of the conveyor belt 15 is indicated in FIG. 4 by dot-dash lines. In this arrangement, the conveyor belt 15, in contrast to the illustration in FIGS. 1 and 2, extends at right angles to the conveying direction of the bucket wheel 4. The arrangement of the conveyor belt 15 is dependent in each case on the existing space conditions.

As can be seen from FIG. 3, each filter chute 21 is arranged to ascend obliquely in the conveying direction of the scraper means 25, so that, in the upper portion of the filter chute 21, the scraper means 25 encounters primarily dry granules while the main part of the water is drained off in the lower zone of the filter chute 21. An inclined arrangement of the perforated bottom 23 in the horizontally mounted filter chute 21 is, in certain cases, sufficient to dewater the granulated material.

The scraper means 25 can consist of an endless rubber belt 28 moved by a driving mechanism 27 and having projecting scraper strips 29 of rubber or the like, integrally molded to the rubber belt 28 at regular intervals. Instead of the rubber belt, it is also possible to utilize a worm or screw for abrading the excess granules of the filter layer 24, wherein the perforated bottom then has a half-round shape.

The scraper unit 25 can be vertically adjusted so that it is not only possible to adjust the thickness of the filter layer 24 and to remove the floating, suspended, and finely-particulate grains settling on the filter layer, but also to entirely remove the filter layer by means of the scraper unit 25 for renewal purposes. The vertical adjustment of the scraper means 25 can take place at both deflection ends of the rubber belt 28 so that optionally the filter layer 24 made up of granules can be maintained at different thicknesses as well along the length of the filter chute 21.

On the outside of the filter chute 21, an overflow chute 30 with a drain 31 can be additionally provided, the drain terminating in a discharge pipe 32 of the water collecting and discharging chamber 22. The discharge pipe 32 of each filter chute 21 is optionally in communication, via a slide valve 33, with the conduit 17 leading to the settling tank 18.

The above-described dewatering device makes it possible to obtain a high degree of purity of the water separated from the granulated material. In a modification of the embodiment explained in conjunction with the dewatering of foundry slag, the apparatus can be utilized in all instances where the filtered water is reused and thus must be pure.

The essential components of the apparatus of FIGS. 6 and 7 for the dewatering of blast furnace slag are a bucket wheel 101, as well as a clarifier 102 with a thickener 103. The bucket wheel 101 revolves in a trough 104, the sand-water mixture entering the latter via a feed pipe 105; this sand-water mixture is formed in a granulating device, not shown, by the injection of presurized water into the liquid slag discharged from a blast furnace. The bucket wheel 101 withdraws the sand-water mixture by means of perforated scoops 106 from the trough 104 and conveys the sand after approximately half a revolution into a hopper 107, the water flowing out of the perforated scoops 106 back into the trough 104. The sand falls from the hopper 107 onto a conveyor belt 108, which latter transports the sand to some other point.

Respectively one overflow chute 109 with a downwardly slanting bottom 110 is arranged on the two longitudinal sides of the bucket wheel trough 104; the water, contaminated with solids, flows over into this overflow chute. A conveying pump 111, comprising a pumping receiver 112 connected upstream thereof, removes the water-solids mixture through a drain 113 located at the lowest point of the chute bottom 110 as well as through a discharge conduit 114 and pumps the mixture through a connecting conduit 115 into the thickener 103. Instead of conveying the solids-water mixture by means of the conveying pump 111, it can also be transported via a connecting conduit, arranged under a gradient, from the overflow chutes 109 of the bucket wheel 101 into the thickener 103.

The thickener 103 exhibits a cylindrical outer tank 116 with a continuously extending overflow chute 117 and a thickener hopper 118 arranged at the lower end, this hopper being connected via a drain 118a and a discharge conduit 119 to a feed pump 120, as well as an inner tank 121 with a feed conduit 122 for the water-solids mixture removed by pumping from the overflow chutes 109 of the bucket wheel 101. Between the inner tank 121 and the continuously extending overflow chute 117 of the thickener 103, radially arranged overflow chutes 125 are disposed which are in communication with the overflow chute 117.

The water-solids mixture removed by the conveying pump 111 from the overflow chutes 109 of the bucket wheel 101 enters the inner tank 121 via the feed conduit 122. If a tangential feed conduit is selected, the contaminated water flows in an initial spiral-shaped flow through the upper portion of the inner tank 121; this flow is smoothed out by the time it reaches the lower end 123 of the inner tank. The water exiting from the lower end 123 of the inner tank 121 rises in a smoothed out flow upwardly within the outer tank 116 and flows by way of the radial chutes 125, covering with their overflow edges 127, 128 the entire surface area of the thickener 103, as well as the continuously extending overflow chute 117 with the overflow edge 129 through an outlet hopper 130 as well as a discharge conduit 131 into a collecting tank, not shown, to be passed on to reuse. The ascending velocity of the water in the outer tank 116 of the thickener 103 can be adapted to the settling velocity of the solids so that a minimum proportion of finely particulate grains remains in the purified water drained out of thickener 103. The proportion of finely particulate grains in the purified water withdrawn from thickener 103 can be determined by measuring the free flow cross section between the outer tank 116 and the inner tank 121.

The conveying pump 120 pumps the concentrated water-solids mixture through a connecting conduit 132 into a delivery means formed, for example, by nozzles 133, arranged above the perforated scoops 106 of the bucket wheel 101 emerging from the water and filled with slag sand-water mixture, the bucket wheel 101 revolving in the direction of rotation a. The slag sand conveyed in the perforated scoops 106 of the bucket wheel 101 forms a filter 134 for the concentrated water-solids mixture injected via nozzles 133; this filter separates the solids.

When the bucket wheel 101 is at a standstill, the connecting conduit 132 is sealed off by a shutoff element 137, and the pump 120 conveys the concentrated water-solids mixture, which settles in the thickener hopper 118 of the thickener 103, through a bypass conduit 136, which is closed when the bucket wheel 101 is in operation by means of the shutoff valve 135, into the inner tank 121 of the thickener. In this way, not too many solids can settle in the thickener hopper 118, and the mixture remains transportable.

The amount conveyed by the pump 120 is a fraction of the amount fed into the thickener 103. The amount of concentrated water-solids mixture passing into the delivery nozzles 133 above the bucket wheel 101 can be controlled by varying the speed of pump 120.

In a modified embodiment of the dewatering device according to FIGS. 6 and 7, the discharge conduit 119 of the thickener hopper 118 of thickener 103, the conveying pump 120, and the connecting line 132 to the nozzles 133 above the bucket wheel 101, as well as the bypass conduit 136 branching off from the connecting conduit 132 into the inner tank 121 of the thickener 103 are eliminated, and the drain 118a of the thickener hopper 118 of thickener 103 is connected via a connecting conduit 138 to a settling tank 139.

What we claim is:

1. Process for dewatering granular particulate, mineral material, comprising feeding the material to a bucket wheel (3), dewatering the material in perforated scoops (13, 106) of the bucket wheel (4, 101), conveying the material via a hopper (14, 107) to a continuous conveyor (15, 108), and collecting the water overflowing from the bucket wheel (3) and containing floating and suspended particles, in filter chutes wherein the floating and suspended particles form a filter layer above a perforated bottom; continuously scraping the granules of the filter layer from the top sufficient to provide a continuous rehabilitated precoat layer of said particulate mineral material, and transferring the scrapped-off material to said continuous conveyor; and feeding the water, filtered in this way, to a settling tank for reuse.

* * * * *